(12) United States Patent
Li et al.

(10) Patent No.: US 12,542,301 B2
(45) Date of Patent: Feb. 3, 2026

(54) SUPRAMOLECULAR IONIC LIQUID, SOLID-STATE ELECTROLYTE MEMBRANE, SOLID-STATE LITHIUM METAL BATTERY, AND APPARATUS

(71) Applicant: CONTEMPORARY AMPEREX TECHNOLOGY (HONG KONG) LIMITED, Hong Kong (CN)

(72) Inventors: Qian Li, Ningde (CN); Chengyong Liu, Ningde (CN); Yongsheng Guo, Ningde (CN); Jiawei Fu, Ningde (CN); Bobing Hu, Ningde (CN); Meng Cheng, Ningde (CN); Ang Fu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 487 days.

(21) Appl. No.: 18/062,583

(22) Filed: Dec. 7, 2022

(65) Prior Publication Data

US 2023/0198015 A1   Jun. 22, 2023

Related U.S. Application Data

(63) Continuation of application No. PCT/CN2020/105917, filed on Jul. 30, 2020.

(51) Int. Cl.
   *H01M 10/0565* (2010.01)
   *C07C 309/07* (2006.01)
   *H01M 10/052* (2010.01)

(52) U.S. Cl.
   CPC ....... *H01M 10/0565* (2013.01); *C07C 309/07* (2013.01); *H01M 10/052* (2013.01);
   (Continued)

(58) Field of Classification Search
   CPC ........................................... H01M 2300/0045
   See application file for complete search history.

(56) References Cited

U.S. PATENT DOCUMENTS

| 6,464,904 | B1 | 10/2002 | Hirose et al. |
| 6,692,658 | B2 * | 2/2004 | Nakamura ......... C09K 19/2007 |
| | | | 252/299.65 |

(Continued)

FOREIGN PATENT DOCUMENTS

| CN | 106654364 A | 5/2017 |
| CN | 108878966 A | 11/2018 |

(Continued)

OTHER PUBLICATIONS

Machine translation of JP 2004-115477 A (Year: 2004).*

(Continued)

*Primary Examiner* — Robert S Carrico
(74) *Attorney, Agent, or Firm* — K&L Gates LLP

(57) ABSTRACT

A supramolecular ionic liquid, a solid-state electrolyte membrane, a solid-state lithium metal battery, and an apparatus are provided. The supramolecular ionic liquid of this disclosure has a benzophenanthrene structure represented by formula (I), where $R_1$ is selected from ether groups, polyether groups, halogenated ether groups, or halogenated polyether groups having 1 to 16 carbon atoms; and $R_2$ is selected from ether groups or polyether groups having 1 to 16 carbon atoms. The supramolecular ionic liquid of this disclosure has an ionic conductivity as high as $10^{-3}$ S/cm at room temperature. A solid-state electrolyte membrane made therefrom also has an ionic conductivity as high as $10^{-3}$ S/cm at room temperature. This is close to performance of a liquid electrolyte, proposing a solution to the problem of low ionic conductivity in existing solid-state electrolytes.

15 Claims, 4 Drawing Sheets

(52) U.S. Cl.
CPC . *C07C 2603/42* (2017.05); *H01M 2300/0045* (2013.01); *H01M 2300/0082* (2013.01)

(56) References Cited

U.S. PATENT DOCUMENTS

| | | |
|---|---|---|
| 2002/0017632 A1 | 2/2002 | Nakamura et al. |
| 2018/0261886 A1 | 9/2018 | Picard et al. |
| 2019/0157715 A1 | 5/2019 | Makino et al. |
| 2021/0020986 A1* | 1/2021 | Shen ................ H01M 10/0565 |

FOREIGN PATENT DOCUMENTS

| | | |
|---|---|---|
| CN | 110098378 A | 8/2019 |
| CN | 111193064 A | 5/2020 |
| CN | 111244537 A | 6/2020 |
| EP | 3109924 A1 | 12/2016 |
| JP | 2004115477 A | 4/2004 |
| WO | 2019170694 A1 | 9/2019 |
| WO | 2020143259 A1 | 7/2020 |

OTHER PUBLICATIONS

First Office Action received in the counterpart Chinese Application 202080095432.9, mailed on May 18, 2024.
Extended European search report received in the counterpart European Application 20947397.4, mailed on Jul. 2, 2024.
International Search Report received in International Application PCT/CN2020/105917, mailed Mar. 30, 2021.
Written Opinion received in International Application PCT/CN2020/105917, mailed Mar. 30, 2021.

* cited by examiner

SUPRAMOLECULAR IONIC LIQUID, SOLID-STATE ELECTROLYTE MEMBRANE, SOLID-STATE LITHIUM METAL BATTERY, AND APPARATUS

CROSS-REFERENCE TO RELATED APPLICATIONS

This disclosure is a continuation of International Application PCT/CN2020/105917, filed on Jul. 30, 2020, and entitled "SUPRAMOLECULAR IONIC LIQUID, SOLID-STATE ELECTROLYTE MEMBRANE, SOLID-STATE LITHIUM METAL BATTERY, AND APPARATUS", which is incorporated herein by reference in its entirety.

TECHNICAL FIELD

This disclosure relates to the field of battery, and specifically, to a supramolecular ionic liquid, a solid-state electrolyte membrane, a solid-state lithium metal battery, and an apparatus.

BACKGROUND

With the advantages of high theoretical specific capacity, low reduction potential, and low density, lithium metal has become the best choice for the next generation high energy density secondary batteries as a negative-electrode material. However, the industrial disclosure of lithium metal negative electrodes remains challenging. The growth of uncontrollable lithium dendrites triggered by irregular deposition of lithium ions on the surface of the negative-electrode has caused safety problems during the use of lithium metal batteries, which has limited the wide disclosure of lithium metal batteries. All-solid-state lithium metal batteries which use solid-state electrolytes instead of organic liquid electrolytes are expected to fundamentally solve the safety issue of batteries while also increasing their energy density, thereby becoming a hot research topic.

In recent years, research on electrolytes based on polymer material has made great strides, but ionic conductivity of such electrolytes at room temperature is still low. Supramolecular material, as a new type of material that is bonded by non-covalent bonds, has attracted attention since the end of last century due to its unique assembly structure and excellent physical and chemical properties, but is not currently applied in the field of solid-state electrolytes.

SUMMARY

This disclosure provides a supramolecular ionic liquid, a solid-state electrolyte membrane, a solid-state lithium metal battery, and an apparatus.

According to a first aspect, this disclosure provides a supramolecular ionic liquid, which has a benzophenanthrene structure represented by formula (I):

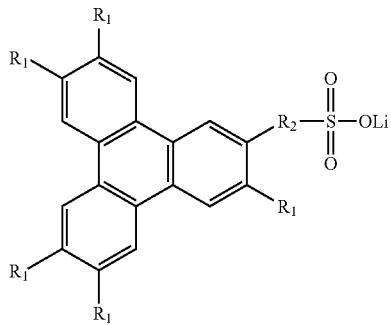

where $R_1$ is selected from ether groups, polyether groups, halogenated ether groups, or halogenated polyether groups having 1 to 16 carbon atoms; and $R_2$ is selected from ether groups or polyether groups having 1 to 16 carbon atoms.

The supramolecular ionic liquid of the first aspect of this disclosure has an ionic conductivity as high as $10^{-3}$ S/cm at room temperature. A solid-state electrolyte membrane prepared therefrom also has an ionic conductivity as high as $10^{-3}$ S/cm at room temperature. This is close to performance of a liquid electrolyte, proposing a solution to the problem of low ionic conductivity, which is common in existing solid-state electrolyte materials.

The ionic conductivity of the supramolecular ionic liquid of this disclosure is closely related to length of a side chain of the supramolecular ionic liquid. When quantities of carbon atoms in $R_1$ and $R_2$ are above 16, chains of $R_1$ and $R_2$ are overlong, affecting orderliness of a π-π stacking structure in the supramolecular ionic liquid, which has adverse effect on construction of an ion migration channel. As a result, the supramolecular ionic liquid and the solid-state electrolyte membranes have poor ionic conductivity at 25° C. Therefore, in side chain substituents of the supramolecular ionic liquid provided in this disclosure, $R_1$ is selected from ether groups, polyether groups, halogenated ether groups, or halogenated polyether groups having 1 to 16 carbon atoms; and $R_2$ is selected from ether groups or polyether groups having 1 to 16 carbon atoms.

In some embodiments, $R_1$ is selected from structures represented by formula (II):

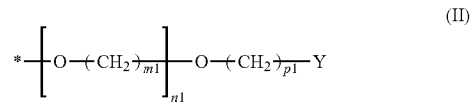

where m1 is selected from 1-6, n1 is selected from 1-5, p1 is selected from 0-4, and Y is selected from H, F, Cl, or Br.

Further optionally, formula (II) meets at least one of the following conditions: (1) m1 is selected from 2-3; (2) n1 is selected from 2-3; (3) p1 is selected from 1-2; and (4) Y is selected from H or F.

When a chain length of $R_1$ is in an appropriate range, the orderliness of a π-π stacking structure in the supramolecular ionic liquid is desirable, and a volume of free radicals is appropriate, which helps the construction of the ion migration channel and increases lithium ion migration capacity.

With the end of $R_1$ unsubstituted, the supramolecular ionic liquid has good ionic conductivity, and is easy to prepare and acquire. With the end of $R_1$ substituted by halogen, the supramolecular ionic liquid still has good ionic conductivity; especially when the end of $R_1$ is substituted by F, LiF produced during cell cycling is helpful to form a stable interface, and thus cycling performance of a battery is further enhanced.

In some embodiments, $R_2$ is selected from structures represented by formula (III):

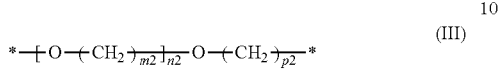
(III)

where when n2 is not 0, m2 is selected from 1-6, n2 is selected from 1-5, and p2 is selected from 0-4; and when n2 is 0, p2 is selected from 1-16, and further optionally, when n2 is 0, p2 is selected from 4-10.

When n2 is not 0, formula (III) meets at least one of the following conditions: (1) m2 is selected from 2-3; (2) n2 is selected from 2-3; and (3) p2 is selected from 1-2.

When n2 is not 0, the supramolecular ionic liquid is a structure with ether chains fully substituted, having better ionic conductivity. However, fluidity of the supramolecular ionic liquid with ether chains fully substituted is relatively strong. When a polymer matrix is introduced to further prepare the solid-state electrolyte membrane, interaction between the supramolecular ionic liquid and the polymer matrix increases, which is not conducive to mechanical strength of the solid-state electrolyte membrane. Therefore, there should not be too many ether-oxygen repeating units in $R_2$. In some embodiments, m2 is selected from 1-6, n2 is selected from 1-5, and p2 is selected from 0-4. Further optionally, m2 is selected from 2-3, n2 is selected from 2-3, and p2 is selected from 1-2.

When n2 is 0, p2 is selected from 1-16; and further optionally, when n2 is 0, p2 is selected from 4-10. In this case, $R_2$ has an appropriate chain length, which helps formation of a stable cylindrical structure by self assembly of benzophenanthrene structures through π-π stacking, improving the ionic conductivity of the supramolecular ionic liquid and the solid-state electrolyte membrane.

Specifically, $R_1$ and $R_2$ in the formula (I) are selected from one of I-1 to I-22:

I-1
$R_1 = *—O—CH_2—O—CH_3$, $R_2 = *—O—(CH_2)_6—*$

I-2
$R_1 = *—O—(CH_2)_2—O—CH_2—CH_3$, $R_2 = *—O—(CH_2)_6—*$

I-3
$R_1 = *—[O—(CH_2)_2]_2—O—CH_2—CH_3$, $R_2 = *—O—(CH_2)_6—*$

I-4
$R_1 = *—[O—(CH_2)_2]_3—O—CH_2—CH_3$, $R_2 = *—O—(CH_2)_6—*$

I-5
$R_1 = *—[O—(CH_2)_3]_4—O—CH_2—CH_3$, $R_2 = *—O—(CH_2)_6—*$

I-6
$R_1 = *—[O—(CH_2)_4]_3—O—(CH_2)_2—CH_3$, $R_2 = *—O—(CH_2)_6—*$

I-7
$R_1 = *—[O—(CH_2)_4]_4—OH$, $R_2 = *—O—(CH_2)_6—*$

I-8
$R_1 = *—[O—(CH_2)_2]_3—O—CH_2—CH_2—F$, $R_2 = *—O—(CH_2)_6—*$

I-9
$R_1 = *—[O—(CH_2)_2]_3—O—CH_2—CH_2—Cl$, $R_2 = *—O—(CH_2)_6—*$

I-10
$R_1 = *—[O—(CH_2)_2]_3—O—CH_2—CH_2—Br$, $R_2 = *—O—(CH_2)_6—*$

I-11
$R_1 = *—[O—(CH_2)_2]_3—O—CH_2—CH_3$, $R_2 = *—O—CH_2—*$

I-12
$R_1 = *—[O—(CH_2)_2]_3—O—CH_2—CH_3$, $R_2 = *—O—(CH_2)_3—*$

I-13
$R_1 = *—[O—(CH_2)_2]_3—O—CH_2—CH_3$, $R_2 = *—O—(CH_2)_9—*$

I-14
$R_1 = *—[O—(CH_2)_2]_3—O—CH_2—CH_3$, $R_2 = *—O—(CH_2)_{12}—*$

I-15
$R_1 = *—[O—(CH_2)_2]_3—O—CH_2—CH_3$, $R_2 = *—O—(CH_2)_{16}—*$

I-16
$R_1 = *—[O—(CH_2)_2]_3—O—CH_2—CH_3$,
$R_2 = *—O—(CH_2)_3—O—(CH_2)_2—*$

I-17
$R_1 = *—[O—(CH_2)_2]_3—O—CH_2—CH_3$,
$R_2 = *—O—(CH_2)_6—O—(CH_2)_2—*$

I-18
$R_1 = *—[O—(CH_2)_2]_3—O—CH_2—CH_3$,
$R_2 = *—[O—(CH_2)_2]_3—O—(CH_2)_3—*$

I-19
$R_1 = *—[O—(CH_2)_2]_3—O—CH_2—CH_3$,
$R_2 = *—[O—(CH_2)_2]_3—O—(CH_2)_6—*$

I-20
$R_1 = *—[O—(CH_2)_2]_3—O—CH_2—CH_3$,
$R_2 = *—[O—(CH_2)_3]_3—O—(CH_2)_6—*$

I-21
$R_1 = *—[O—(CH_2)_2]_3—O—CH_2—CH_3$,
$R_2 = *—[O—(CH_2)_3]_5—O—CH_2—*$

I-22
$R_1 = *—[O—(CH_2)_2]_3—O—CH_2—CH_3$,
$R_2 = *—[O—(CH_2)_4]_4—O—*$.

In some embodiments, the supramolecular ionic liquid provided in this disclosure is a cylindrical structure formed by a number of the benzophenanthrene structures through π-π stacking and self assembly.

A q value of small-angle X-ray scattering peak of the supramolecular ionic liquid is 15.5 $nm^{-1}$ to 18.8 $nm^{-1}$. In some embodiments, the q value is 16.0 $nm^{-1}$ to 18.5 $nm^{-1}$. Further optionally, the q value is 16.3 $nm^{-1}$ to 18.2 $nm^{-1}$. When the q value is within the foregoing ranges, the disk spacing between a plurality of benzophenanthrene structures in the supramolecular ionic liquid is within a quite appropriate range such that the benzophenanthrene structures are induced to form a desirable cylindrical phase structure through π-π stacking, allowing for formation of a good ion migration channel in an internal structure of the supramolecular ionic liquid, which increases the ionic conductivity.

In some embodiments, the ionic conductivity of the supramolecular ionic liquid provided in this disclosure is $2*10^{-5}$ S/cm to $7*10^{-3}$ S/cm at 25° C.; further optionally, the ionic conductivity of the supramolecular ionic liquid provided in this disclosure is $1.5*10^{-3}$ S/cm to $6.5*10^{-3}$ S/cm at 25° C.

According to a second aspect, this disclosure provides a solid-state electrolyte membrane, including the supramolecular ionic liquid in the first aspect of this disclosure. Ionic conductivity of the solid-state electrolyte membrane provided by the second aspect of this disclosure is as high as $10^{-3}$ S/cm at room temperature, close to performance of a liquid electrolyte.

The solid-state electrolyte membrane provided in this disclosure further includes a polymer matrix, and the polymer matrix meets at least one of the following conditions: (1) the polymer matrix includes a viscoelastic polymer, and a relative molecular mass of the polymer matrix is 1,000-2,000,000; (2) crystallinity of the polymer matrix is 1%-40%, and optionally, 5%-25%; (3) the polymer matrix includes a first polymer and a second polymer, where a relative molecular mass of the first polymer is 400,000-800,000, and a relative molecular mass of the second polymer matrix is 1,000-10,000, and optionally, a mass ratio of the first polymer and the second polymer is 10:1-5:1; and (4) the polymer matrix is selected from one or more of polyethylene oxide, polyethylene terephthalate, polyimide, polyvinylidene fluoride, polymethyl methacrylate, polyacrylonitrile, polypropylene carbonate, polyvinyl chloride, or polyvinylidene fluoride-(2-acrylamido-2-methylpropane sulfonic acid)-trimethylolpropane triacrylate-hyperbranched polyacrylate-methyl methacrylate-copolymer, and optionally, the polymer matrix is selected from one or more of polyethylene oxide, polyvinylidene fluoride, or polymethyl methacrylate.

The solid-state electrolyte membrane provided in this disclosure further includes a lithium salt, and the lithium salt is selected from one or more of $LiPF_6$, $LiBF_4$, $LiClO_4$, $LiAsF_6$, $LiCF_3SO_3$, LiFSI, or LiTFSI. Further optionally, the lithium salt is LiTFSI.

Because the polymer matrix has different dissociation capacities for different lithium salts, when lithium salt LiTFSI is used, the ionic conductivity of the solid-state electrolyte membrane and capacity development and cycling performance of a solid-state lithium metal battery are desirable.

According to a third aspect, this disclosure provides a method for preparing the solid-state electrolyte membrane in the second aspect of this disclosure, including the following steps: providing a polymer matrix, a lithium salt, and the supramolecular ionic liquid in the first aspect of this disclosure; and mixing, hot pressing, and vacuum annealing these substances to obtain the solid-state electrolyte membrane.

In some embodiments, a mass ratio of the polymer matrix, the lithium salt, and the supramolecular ionic liquid is 100:(5-40):(10-80). In some embodiments, after being weighed and mixed, the substances are left in an environment of 1 MPa to 20 MPa and hot pressed at 50° C. to 100° C. In some embodiments, the substances are annealed in vacuum at 60° C. to 80° C. for 1 to 8 hours.

According to a fourth aspect, this disclosure provides a solid-state lithium metal battery, including the solid-state electrolyte membrane in the second aspect of this disclosure.

According to a fifth aspect, this disclosure provides an apparatus, including the solid-state lithium metal battery in the fourth aspect of this disclosure, where the solid-state lithium metal battery is capable of serving as a power source of the apparatus or an energy storage unit of the apparatus.

The supramolecular ionic liquid provided in this disclosure has an ionic conductivity as high as $10^{-3}$ S/cm at room temperature, and the solid-state electrolyte membrane made therefrom also has an ionic conductivity as high as $10^{-3}$ S/cm at room temperature. Therefore, all-solid-state lithium metal batteries prepared using the solid-state electrolyte membrane provided in this disclosure instead of conventional organic liquid electrolytes are expected to fundamentally solve the safety issue of batteries and improve both the energy density and the cycling performance of batteries.

DETAILED DESCRIPTION OF EMBODIMENTS

Figure 1:
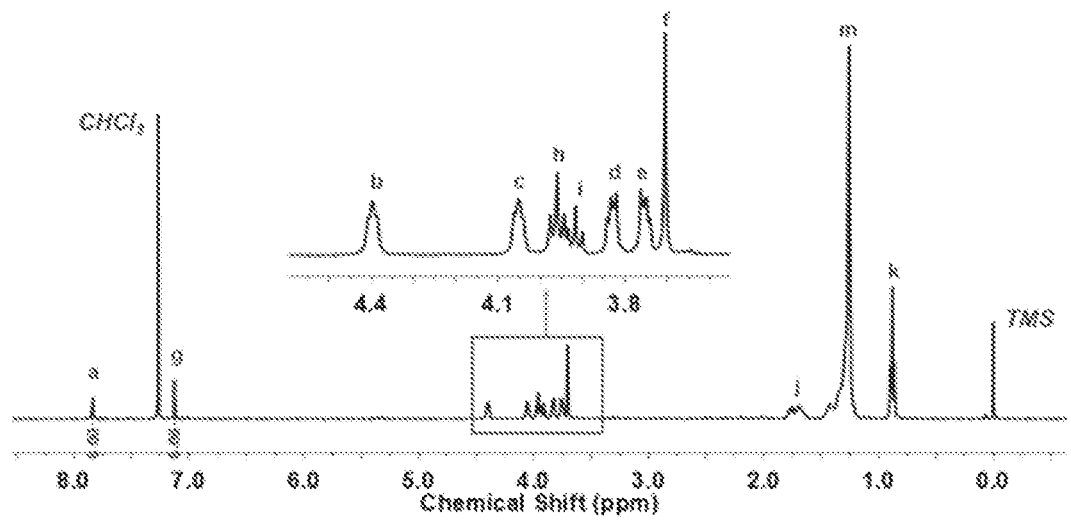
FIG. 1 shows a hydrogen nuclear magnetic resonance spectroscopy of a product of supramolecular ionic liquid preparation example 1 in this disclosure.
Figure 2:
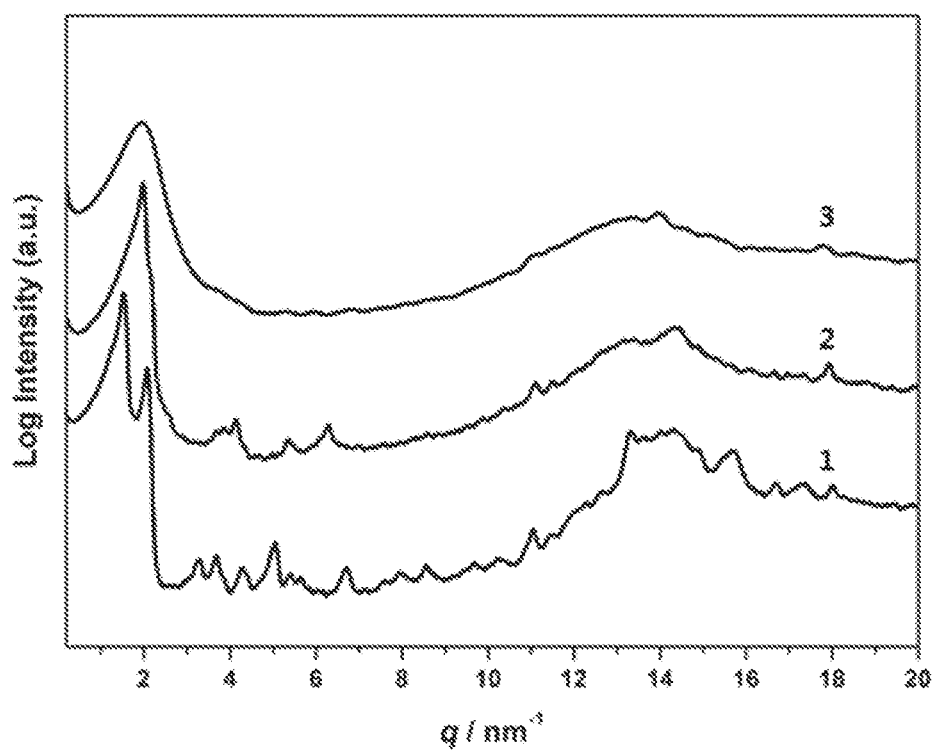
FIG. 2 shows an SAXS spectrum of supramolecular ionic liquid preparation example 1 in this disclosure, where curve 1 represents a supramolecular ionic liquid, curve 2 represents an electrolyte membrane that has been annealed, and curve 3 represents an electrolyte membrane without annealing.

The following further describes this disclosure with reference to embodiments. It should be understood that these embodiments are merely intended to illustrate this disclosure but not to limit the scope of this disclosure.

Reference signs are described as follows:

1. battery pack;
2. upper box body;
3. lower box body;
4. battery module;
5. solid-state lithium metal battery;
51. housing;
52: electrode assembly; and
53. cover assembly.

Supramolecular Ionic Liquid

According to a first aspect of this disclosure, some embodiments of this disclosure provide a supramolecular ionic liquid, which has a benzophenanthrene structure represented by formula (I):

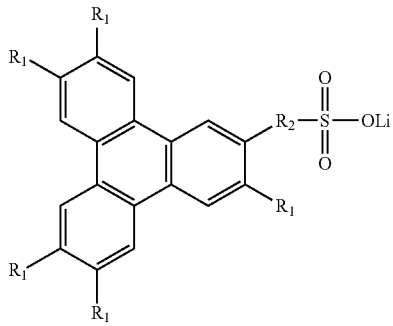

(I)

where $R_1$ is selected from ether groups, polyether groups, halogenated ether groups, or halogenated polyether groups having 1 to 16 carbon atoms; and R2 is selected from ether groups or polyether groups having 1 to 16 carbon atoms.

The supramolecular ionic liquid of this disclosure has an ionic conductivity as high as $10^{-3}$ S/cm at room temperature. A solid-state electrolyte membrane made therefrom also has an ionic conductivity as high as $10^{-3}$ S/cm at room temperature. This is close to performance of a liquid electrolyte, proposing a solution to the problem of low ionic conductivity, which is common in existing solid-state electrolyte materials.

In some embodiments of this disclosure, $R_1$ is selected from structures represented by formula (II):

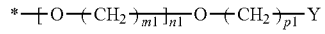

(II)

where m1 is selected from 1-6, n1 is selected from 1-5, p1 is selected from 0-4, and Y is selected from H, F, Cl, or Br.

In some embodiments of this disclosure, formula (II) meets at least one of the following conditions: (1) m1 is selected from 2-3; (2) n1 is selected from 2-3; (3) p1 is selected from 1-2; and (4) Y is selected from H or F.

In some embodiments of this disclosure, R2 is selected from structures represented by formula (III):

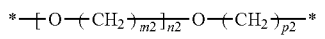

(III)

In some embodiments of this disclosure, m2 is selected from 1-6, n2 is selected from 1-5, and p2 is selected from 0-4.

In some embodiments of this disclosure, n2 is 0, and p2 is selected from 1-16.

In some embodiments of this disclosure, n2 is 0, and p2 is selected from 4-10.

In some embodiments of this disclosure, n2 is not 0, and formula (III) meets at least one of the following conditions: (1) m2 is selected from 2-3; (2) n2 is selected from 2-3; and (3) p2 is selected from 1-2.

In some embodiments of this disclosure, $R_1$ and $R_2$ in the formula (I) are selected from one of I-1 to I-22:

I-1
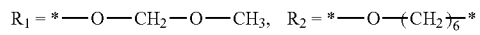

I-2
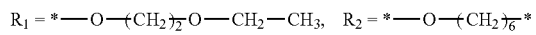

I-3
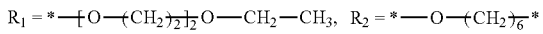

I-4
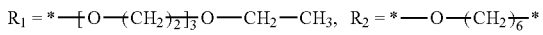

I-5
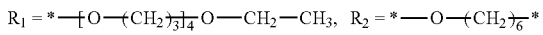

I-6
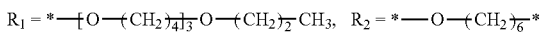

I-7

I-8
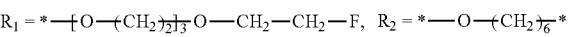

I-9
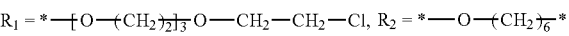

I-10
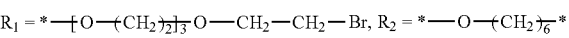

I-11
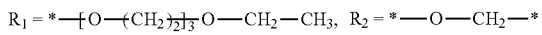

I-12
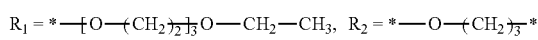

I-13
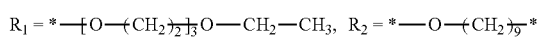

I-14
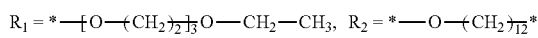

I-15
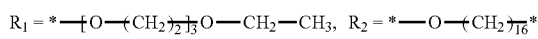

I-16
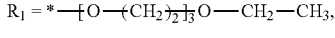
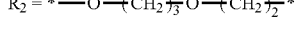

I-17
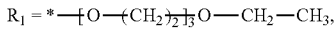
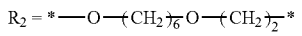

I-18
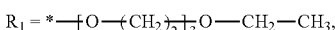
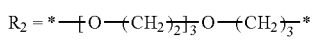

I-19
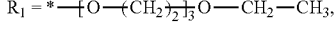
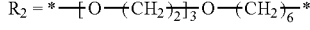

I-20
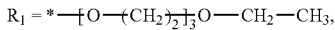
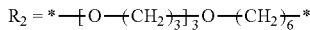

I-21
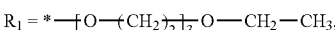
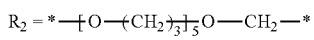

I-22
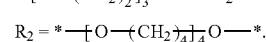

The supramolecular ionic liquid provided in this disclosure is a cylindrical structure formed by a number of the benzophenanthrene structures through π-π stacking and self assembly.

In some embodiments, a q value of small-angle X-ray scattering peak of the supramolecular ionic liquid provided in this disclosure is 15.5 nm$^{-1}$ to 18.8 nm$^{-1}$.

In some embodiments of this disclosure, the q value of small-angle X-ray scattering peak of the supramolecular ionic liquid provided in this disclosure is 16.0 nm$^1$ to 18.5 nm$^{-1}$.

In some embodiments, the q value of small-angle X-ray scattering peak of the supramolecular ionic liquid provided in this disclosure is 16.3 nm$^1$ to 18.2 nm$^1$.

The q value of small-angle X-ray scattering peak of the supramolecular ionic liquid reflects a disk spacing of benzophenanthrene in π-π stacking (π-π stacking). When the q value of small-angle X-ray scattering peak of the supramolecular ionic liquid is within the foregoing ranges, the disk spacing between a plurality of benzophenanthrene structures in the supramolecular ionic liquid is within a quite appropriate range such that the benzophenanthrene structures are induced to form a desirable cylindrical phase structure through π-π stacking, allowing for formation of a good ion migration channel in an internal structure of the supramolecular ionic liquid, which increases the ionic conductivity.

In some embodiments of this disclosure, the ionic conductivity of the supramolecular ionic liquid provided in this disclosure is 2*10$^{-5}$ S/cm to 7*10$^{-3}$ S/cm at 25° C.

In some embodiments, the ionic conductivity of the supramolecular ionic liquid provided in this disclosure is 1.5*10-3 S/cm to 6.5*10-3 S/cm at 25° C.

Preparation of Supramolecular Ionic Liquid

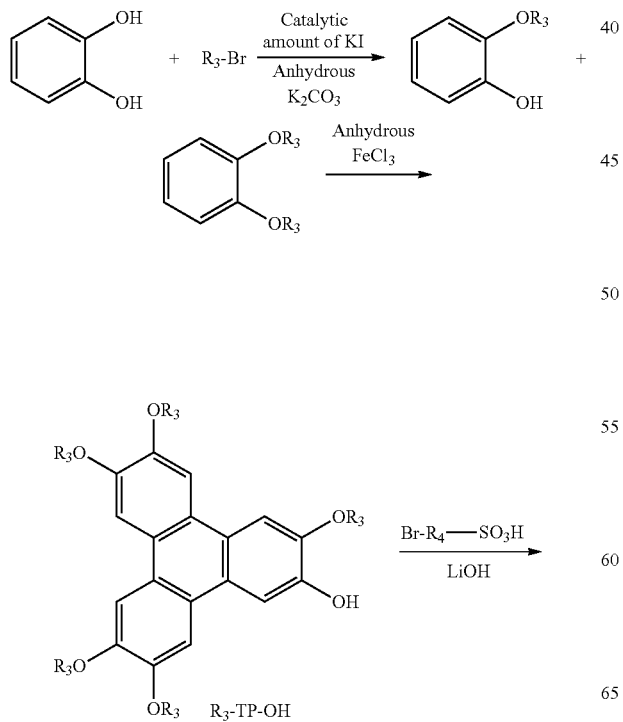

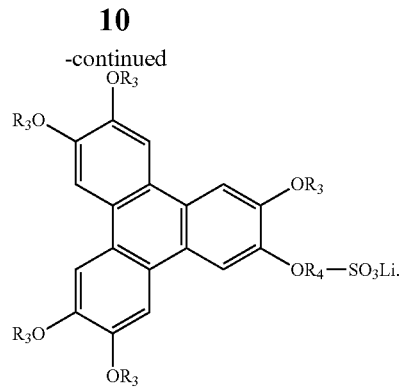

where
R$_3$ is selected from ether groups, polyether groups, halogenated ether groups, or halogenated polyether groups having 1 to 16 carbon atoms; and
Further, R$_3$ may be selected from structures represented by formula (III):

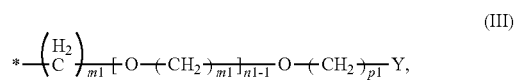

where m1, n1, p1 and Y are defined the same as in the claims.
R$_4$ is selected from ether groups or polyether groups having 1 to 16 carbon atoms;
Further, R$_4$ may be selected from structures represented by formula (IV):

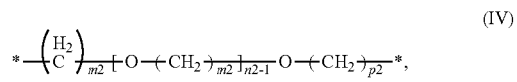

where n2, m2, n2 and p2 are defined the same as in the claims.

Catechol, Br—R$_3$, anhydrous potassium carbonate and catalytic amount of KI are put in a three neck flask; absolute ethanol is added and an oil bath at a constant temperature of 100° C. is given. A mechanical stir is applied and a reflux reaction takes place, where the solution turns gradually darkened from a gray color at the beginning. After 48 h reaction, gray granular insoluble matter is removed by filtration, and diluted hydrochloric acid (10% v/v) is added into a brown filtrate. Then extraction is performed using methylene chloride (2*100 ml), and the methylene chloride is removed by rotary evaporation to obtain a brown liquid. Finally column purification is performed (petroleum ether: methylene chloride=2:1 [v/v]).

The product of the previous step is put in a three neck flask and an appropriate amount of dry methylene chloride is added. A mechanical stir is given under an ice salt bath with anhydrous ferric chloride added in batches under nitrogen protection. The ice salt bath is removed after 30 min stirring, and a reaction takes place at room temperature. TLC (petroleum etherdichloromethane=1:1, v/v) is used to track the reaction progress. After the reaction is finished, 80 ml of methanol is added slowly and dropwise under an ice salt bath, A 1 h stir is given and then distilled water is added. The resulting mixture is extracted with methylene chloride, and the methylene chloride is removed by rotary evaporation to obtain a black solid. The crude product is passed through a column (petroleum ether:dichloromethane=1:1, v/v), a leached fraction is concentrated and passed through the column again (petroleum ether:ethyl acetate=30:1, v/v). A yellow solution thus obtained is concentrated to a light-yellow solid product $R_3$-TP-OH, which is dried overnight at room temperature in a vacuum oven to obtain a light-yellow solid.

Williamson reaction: $R_3$-TP-OH and Br—$R_4$—$SO_3$H are dissolved in DMF, which, with 10.0 g of LiOH added, is heated to 70° C., and stirred at reflux overnight. After a product was precipitated by ethanol, water washing is given 3 times. After vacuum drying, a light-yellow viscous liquid is obtained, which is the supramolecular ionic liquid of this disclosure.

Preparation Examples of Supramolecular Ionic Liquid

Preparation Example 1

10.98 g of catechol, 24.02 g of Br-$R_3$

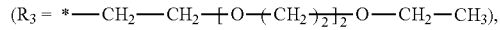

41 g of anhydrous potassium carbonate and catalytic amount of KI are put in a 250 ml three neck flask; 150 ml of absolute ethanol is added and an oil bath at a constant temperature of 100° C. is given. A mechanical stir is applied and a reflux reaction takes place, where the solution turns gradually darkened from a gray color at the beginning. After 48 h reaction, gray granular insoluble matter is removed by filtration, and 200 ml of diluted hydrochloric acid (10% v/v) was added into a brown filtrate. Then extraction is performed using methylene chloride (2*100 ml), and the methylene chloride is removed by rotary evaporation to obtain a brown liquid, which is passed through a column for purification (petroleum ether:methylene chloride=2:1 [v/v]). A product yield is 21.05 g, 90.8%.

21.05 g of the product of the previous step is put in a 250 ml three neck flask and 115 ml of dry methylene chloride is added. A mechanical stir is given under an ice salt bath with 39 g of anhydrous ferric chloride added in batches under nitrogen protection. The ice salt bath is removed after 30 min stirring, and a reaction takes place at room temperature. TLC (petroleum ether:dichloromethane=1:1, v/v) is used to track the reaction progress. After the reaction is finished, 80 ml of methanol is added slowly and dropwise under an ice salt bath. A 1 h stir is given and 385 ml distilled water is added. The resulting mixture is extracted with 1000 ml methylene chloride, and the methylene chloride is removed by rotary evaporation to obtain a black solid. The crude product is passed through a column (petroleum ether:dichloromethane=1:1, v/v), a leached fraction is concentrated and passed through the column again (petroleum ether:ethyl acetate=30:1, v/v). A yellow solution thus obtained is concentrated to a light-yellow solid product $R_3$-TP-OH, which is dried overnight at room temperature in a vacuum oven to obtain 4.74 g of light-yellow solid, with a 21% yield.

Williamson reaction is used. 3.0 g of $R_3$-TP-OH and 6.0 g of Br—$R_4$—$SO_3$H

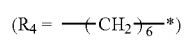

are dissolved in DMF, which, with 10.0 g of LiOH added, is heated to 70° C., and stirred at reflux overnight. After a product is precipitated by ethanol, water washing is given 3 times. After vacuum drying, a light-yellow viscous liquid $R_3$-TP-$R_4$—$SO_3$Li is obtained (the supramolecular ionic liquid in example 4). Yield is 17%.

Product Characterization:

Hydrogen nuclear magnetic resonance spectroscopy ($^1$H NMR) and carbon spectroscopy ($^{13}$C): Bruker ARX 400 (400 MHz) and ARX 500 (500 MHz) nuclear magnetic resonance spectrometers.

Small-angle/wide-angle X-ray scattering (SAXS/WAXS): an Anton Paar SAXSess mc2 high-throughput small-angle X-ray scattering instrument with an Anton Paar TCS120 hot table; Cu target is used as an X-ray source, and an α ray of monochromatized CuK has a wavelength 2 of 0.1542 nm, which is capable of simultaneous measurements of small-angle region SAXS and wide-angle region WAXS. Q values are collected from the range of 0.06-29 $nm^{-1}$, where $q=4\pi \sin \theta/\lambda$ and $2\theta$ is a scattering angle. A solid powder sample is wrapped and tested in aluminum foil, and background signals in the aluminum foil is removed using SAXSquant software 3.80.

Preparation Example 2

The same method is used as preparation example 1, with

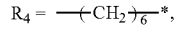

to obtain a yellow viscous liquid (the supramolecular ionic liquid in example 9), with a 22% yield.

Preparation Example 3

The same method is used as preparation example 1, with

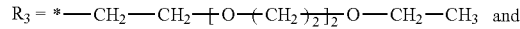

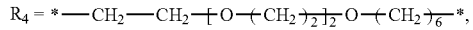

to obtain a yellow viscous liquid (the supramolecular ionic liquid in example 19), with a 20% yield.

Preparation Example 4

The same method is used as preparation example 1, with

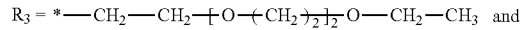

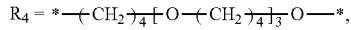

to obtain a yellow viscous liquid (the supramolecular ionic liquid in example 22), with a 16% yield.

Preparation Example 5

The same method is used as preparation example 1, with $R_3 = \text{*---CH}_2\text{---O---CH}_3$ and

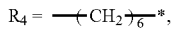

to obtain a yellow viscous liquid (the supramolecular ionic liquid in example 1), with a 12% yield.

Solid-State Electrolyte Membrane

According to a second aspect of this disclosure, some embodiments of this disclosure provide a solid-state electrolyte membrane, including the supramolecular ionic liquid in the first aspect of this disclosure.

The solid-state electrolyte membrane provided in this disclosure further includes a polymer matrix, and the polymer matrix meets at least one of the following conditions: (1) the polymer matrix includes a viscoelastic polymer, and a relative molecular mass of the polymer matrix is 1,000-2,000,000; (2) crystallinity of the polymer matrix is 1%-40%, optionally, 5%-25%; (3) the polymer matrix includes a first polymer and a second polymer, where a relative molecular mass of the first polymer is 400,000-800,000, and a relative molecular mass of the second polymer is 1,000-10,000, optionally, a mass ratio of the first polymer and the second polymer is 10:1-5:1; and (4) the polymer matrix is selected from one or more of polyethylene oxide, polyethylene terephthalate, polyimide, polyvinylidene fluoride, polymethyl methacrylate, polyacrylonitrile, polypropylene carbonate, polyvinyl chloride, or polyvinylidene fluoride-(2-acrylamido-2-methylpropane sulfonic acid)-trimethylolpropane triacrylate-hyperbranched polyacrylate-methyl methacrylate-copolymer, and optionally, the polymer matrix is selected from one or more of polyethylene oxide, polyvinylidene fluoride, or polymethyl methacrylate.

The solid-state electrolyte membrane provided in this disclosure further includes a lithium salt, and the lithium salt is selected from one or more of $LiPF_6$, $LiBF_4$, $LiClO_4$, $LiAsF_6$, $LiCF_3SO_3$, LiFSI, or LiTFSI.

Preparation of Solid-State Electrolyte Membrane

According to a third aspect of this disclosure, some embodiments of this disclosure provide a method for preparing the solid-state electrolyte membrane in the second aspect of this disclosure, including the following steps: providing a polymer matrix, a lithium salt, and the supramolecular ionic liquid in the first aspect of this disclosure; and mixing, hot pressing, and vacuum annealing these substances to obtain the solid-state electrolyte membrane.

In some embodiments, a mass ratio of the polymer matrix, the lithium salt, and the supramolecular ionic liquid is 100:(5-40):(10-80). In some embodiments, after being weighed and mixed, the substances are placed in an environment of 1 MPa to 20 MPa and hot pressed at 50° C. to 100° C. In some embodiments, the substances are annealed in vacuum at 60° C. to 80° C. for 1 to 8 hours.

Solid-State Lithium Metal Battery

According to a fourth aspect of this disclosure, some embodiments of this disclosure provide a solid-state lithium metal battery, which includes the solid-state electrolyte membrane in the second aspect of this disclosure.

Specifically, the solid-state lithium metal battery provided in some embodiments of this disclosure may include a positive-electrode plate, a negative-electrode plate, a solid-state electrolyte membrane sandwiched between the positive-electrode plate and the negative-electrode plate, and the solid-state electrolyte membrane is the solid-state electrolyte membrane in the second aspect of this disclosure.

Except for the use of the solid-state electrolyte membrane in the second aspect of this disclosure, construction and preparation method of the solid-state lithium metal battery in this disclosure is well-known.

In the solid-state lithium metal battery, the positive-electrode plate includes a positive-electrode current collector and a positive-electrode active substance layer disposed on at least one surface of the positive-electrode current collector. In the positive-electrode plate, the positive-electrode active substance layer can be provided on one surface of the positive-electrode current collector or on two surfaces of the positive-electrode current collector.

Those skilled in the art may select a suitable method for preparing the positive-electrode plate. For example, the following steps may be included: mixing the positive-electrode material, a binder, and a conductive agent to form a slurry, and applying the slurry on the positive current collector.

There is no special limitation on the specific type of the positive-electrode active substance, as long as it can intercalate and release lithium ions. The positive-electrode active substance can be either a layered structural material to diffuse lithium ions in a two-dimensional space, or a spinel structure to diffuse lithium ions in a three-dimensional space. In some embodiments, the positive-electrode active substance may be selected from one or more of lithium transition metal oxide or compounds obtained by adding other transition metal or non-transition metal or non-metal to lithium transition metal oxide. Specifically, the positive-electrode active substance may be selected from one or more of lithium cobalt oxide, lithium nickel oxide, lithium manganese oxide, lithium nickel manganese oxide, lithium nickel cobalt manganese oxide, lithium nickel cobalt aluminum oxide, and olivine-structure lithium-containing phosphate.

A general formula of the olivine-structure lithium-containing phosphate may be $LiFe_{1-x-y}Mn_xM'_y PO_4$, where $0 \le x \le 1$, $0 \le y \le 1$, $0 \le x+y \le 1$, and M' is selected from one or more of transition metal elements other than Fe and Mn and non-transition metal elements, and specifically M' may be selected from one or more of Cr, Mg, Ti, Al, Zn, W, Nb, and Zr. In some embodiments, the olivine-structure lithium-containing phosphate is selected from one of more of lithium iron phosphate, lithium manganese phosphate, and lithium iron manganese.

The lithium-containing transition metal oxide is selected from one or more of $LiCoO_2$, $LiMnO_2$, $LiNiO_2$, $LiMn_2O_4$, $LiNi_xCo_yMn_{1-x-y}O_2$, $LiNi_xCo_yAl_{1-x-y}O_2$, and $LiNi_xMn_{2-x}O_4$, where $0<x<1$, $0<y<1$, and $0<x+y<1$. In some embodiments, the lithium-containing transition metal oxide is selected from one or more of $LiCoO_2$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}Co_{0.15}Mn_{0.05}O_2$, $LiNi_{0.8}Co_{0.15}Al_{0.05}O_2$, $LiNi_{10.5}Mn_{1.5}O_4$, and $LiMn_2O_4$.

In the positive-electrode plate, the positive-electrode active material layer may further include a conductive agent and a binder. The conductive agent and the binder are not limited to any specific types or amounts, which may be selected according to actual needs. The binder typically includes a fluorine-containing polyolefin binder. With respect to fluorine-containing polyolefin binders, water is usually a good solvent. In other words, fluorine-containing polyolefin binders usually exhibit good solubility in water. For example, the fluorine-containing polyolefin binder may include but is not be limited to polyvinylidene fluoride (PVDF), vinylidene fluoride copolymer or their modified (for example, modified by carboxylic acid, acrylic acid, or acrylonitrile) derivatives. In the positive-electrode material layer, the amount of binder used may not be too high because of poor conductivity of the binder. In some embodiments, a mass percentage of the binder in the positive active substance layer is less than or equal to 2 wt % so as to obtain relatively low impedance of the electrode plate. The conductive agent of the positive-electrode plate may be a variety of conductive agents applicable to lithium-ion (secondary) batteries in the field, for example, may include but is not limited to a combination of one or more of acetylene black, conductive carbon black, vapor grown carbon fiber (VGCF), carbon nanotube (CNT), Ketjen black, or the like. Mass of the conductive agent may be 1 wt % to 10 wt % of total mass of the positive-electrode material layer. In some embodiments, a mass ratio of the conductive agent to the positive-electrode active material in the positive-electrode plate is greater than or equal to 1.5:95.5.

In the positive-electrode plate, the positive-electrode current collector is also not limited to any specific type, which may be selected according to actual needs. The positive current collector may typically be a layer, and the positive current collector may typically be a structure or part that can collect current. The positive-electrode current collector may be various materials suitable to be used as the positive-electrode current collector of an electrochemical energy storage apparatus in the art. For example, the positive-electrode current collector may include but is not limited to a metal foil, and more specifically, may include but is not limited to a nickel foil or an aluminum foil.

In the solid-state lithium metal battery, the negative-electrode plate may include a negative-electrode current collector and a lithium metal layer on a surface of the negative-electrode current collector. The negative-electrode current collector is usually a structure or part that collects current. The negative-electrode current collector may be various materials suitable to be used as the negative-electrode current collector of an electrochemical energy storage apparatus in the art. For example, the negative-electrode current collector may include but is not limited to a metal foil, and more specifically, may include but is not limited to a copper foil. In addition, the negative-electrode plate may alternatively be a lithium plate.

Figure 3:
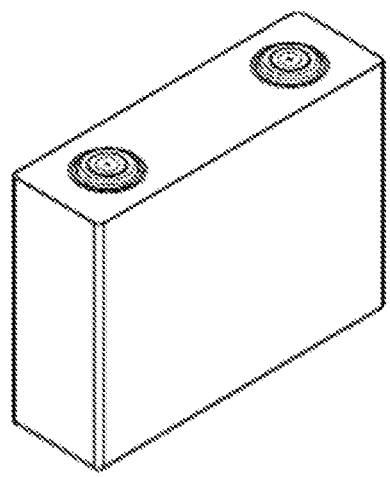
FIG. 3 is a three-dimensional diagram of a solid-state lithium metal battery according to an embodiment of this disclosure.
Figure 4:
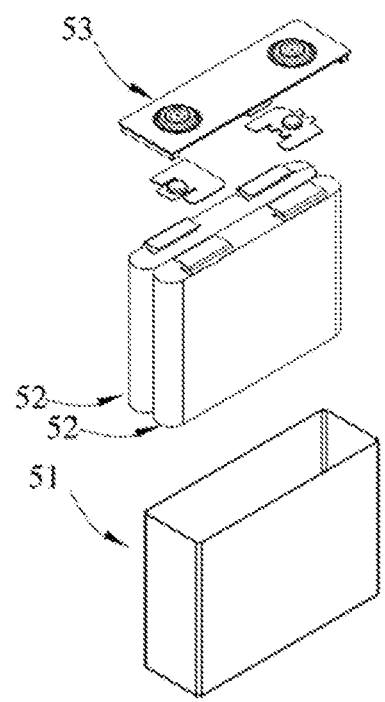
FIG. 4 is an exploded view of the solid-state lithium metal battery in FIG. 3.

This disclosure does not impose special limitations on the shape of the solid-state lithium metal battery, and the solid-state lithium metal battery may be of a rectangular shape or any other shapes. FIG. 3 is a three-dimensional diagram of a solid-state lithium metal battery according to an embodiment of this disclosure. FIG. 4 is an exploded view of the solid-state lithium metal battery in FIG. 3. Referring to FIG. 3 and FIG. 4, the solid-state lithium metal battery 5 (hereinafter referred to as battery cell 5) according to this disclosure includes an outer package 51, an electrode assembly 52, and a top cover assembly 53. The electrode assembly 52 is accommodated in the housing 51. A quantity of the electrode assemblies 52 is not limited, and may be one or more.

It should be noted that the battery cell 5 in FIG. 3 is a tank type battery, but is not limited thereto in this disclosure. The battery cell 5 may be a bag type battery, which means that the housing 51 is replaced with a metal plastic film and the top cover assembly 53 is canceled.

Figure 5:
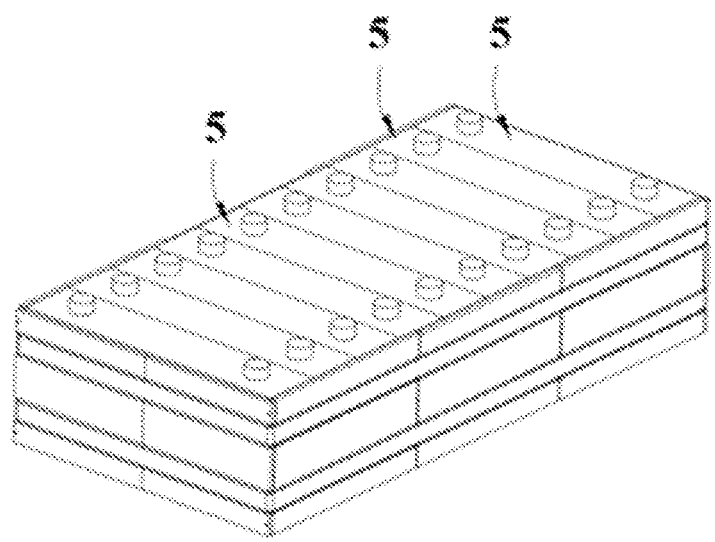
FIG. 5 is a three-dimensional diagram of a battery module according to an embodiment of this disclosure.

In some embodiments, solid-state lithium metal batteries may be assembled into a battery module, and a battery module may include a plurality of solid-state lithium metal batteries. The specific quantity may be adjusted according to the use case and capacity of the battery module. FIG. 5 is a three-dimensional diagram of a battery module 4 as an example. Referring to FIG. 5, in the battery module 4, a plurality of solid-state lithium metal batteries 5 may be sequentially arranged in a length direction of the battery module 4. Certainly, the plurality of solid-state lithium metal batteries 5 may be arranged in any other manner. Further, the plurality of solid-state lithium metal batteries 5 may be fastened by using fasteners. In some embodiments, the battery module 4 may further include a housing with an accommodating space, and the plurality of solid-state lithium metal batteries 5 are accommodated in the accommodating space.

Figure 6:
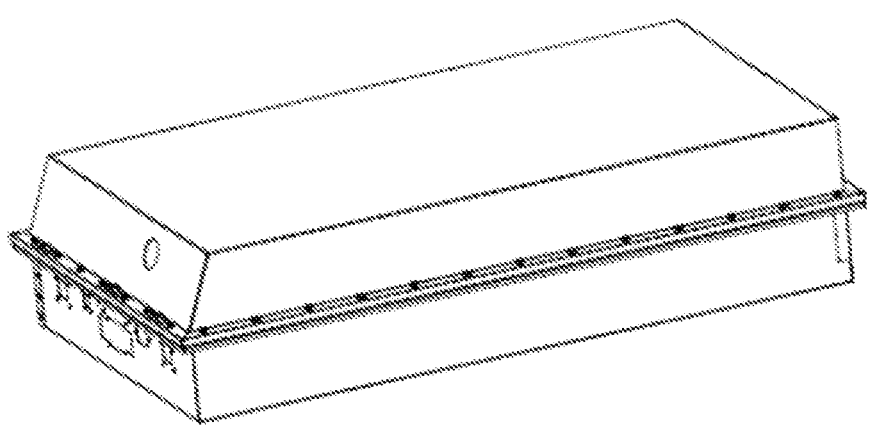
FIG. 6 is a three-dimensional diagram of a battery pack according to an embodiment of this disclosure.
Figure 7:
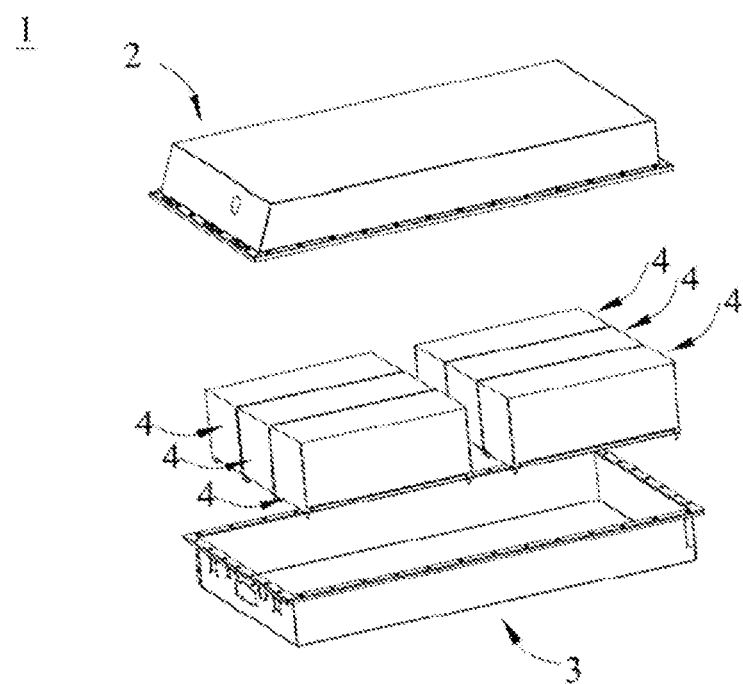
FIG. 7 is an exploded view of the battery pack in FIG. 6.

In some embodiments, the battery module may be further assembled into a battery pack, and a quantity of battery modules included in the battery pack may be adjusted based on disclosure and capacity of the battery pack. FIG. 6 is a three-dimensional diagram of a battery pack 1 as an example. FIG. 7 is an exploded view of the battery pack in FIG. 6. Referring to FIG. 6 and FIG. 7, the battery pack 1 may include a battery box and a plurality of battery modules 4 disposed in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

Apparatus

A fifth aspect of this disclosure provides an apparatus, including the solid-state lithium metal battery in the fourth aspect of this disclosure, where the solid-state lithium metal battery serves as a power source of the apparatus or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A solid-state lithium metal battery, a battery module, or a battery pack may be selected for the apparatus according to requirements for using the apparatus.

Figure 8:
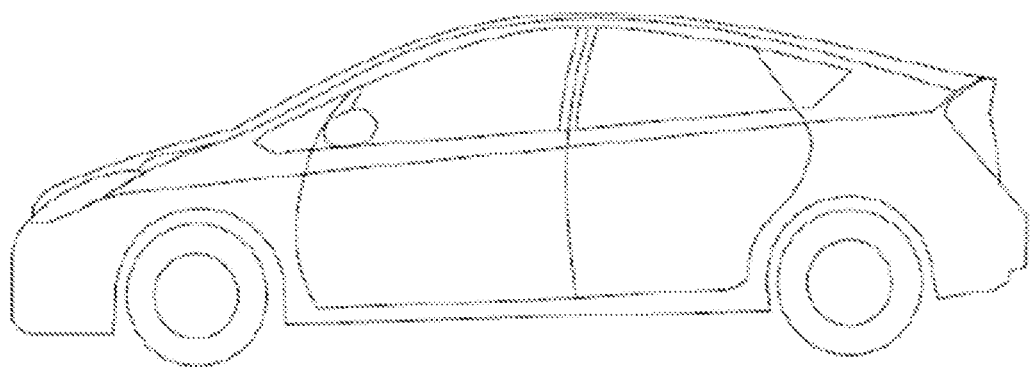
FIG. 8 is a schematic diagram of an apparatus according to an embodiment of this disclosure.

FIG. 8 is a schematic diagram of an apparatus according to an embodiment. The apparatus may be a battery electric vehicle, a hybrid electric vehicle, a plug-in hybrid electric vehicle, or the like. To meet requirements of the apparatus for high power and a high energy density of a solid-state lithium metal battery (that is, the secondary battery of this disclosure), a battery pack or a battery module may be used.

In another example, the apparatus may be a mobile phone, a tablet computer, a notebook computer, or the like. Such apparatus is generally required to be light and thin, and may use a solid-state lithium metal battery (that is, the secondary battery of this disclosure) as its power source.

The following further describes advantages of this disclosure with reference to specific examples. It should be understood that these examples are merely intended to describe this disclosure but not to limit the scope of this disclosure. Unless otherwise specified, various parameters in this specification have general meanings well known in the art, and may be measured by using methods well known in the art. For example, they may be tested in methods provided in the examples of this disclosure. In addition, ranges and options of different parameters provided in the examples may be randomly combined, and combinations thus obtained are all considered to fall within the disclosed scope of this disclosure.

Examples 1 to 25

Preparation of Solid-State Electrolyte Membrane 100 parts of polymer matrix, 30 parts of lithium salt, and 40 parts of supramolecular ionic liquid were weighted by mass; after being weighed and mixed, these substances were placed in an environment of 10 MPa and hot pressed at 70° C., and then annealed in vacuum at 60° C. to 80° C. for 4 hours to obtain a solid-state electrolyte membrane.

The positive-electrode plate and negative-electrode plate were prepared by using a conventional method in the art.

Positive-electrode plate: $LiNi_{0.8}Co_{0.1}Mn_{0.1}O_2$, conductive agent conductive carbon, and binder polyvinylidene fluoride (PVDF) were mixed at a mass ratio of 96:2:2 to prepare positive-electrode slurry of a lithium-ion battery with a specific viscosity. The positive-electrode slurry was applied on a collector aluminum foil. The coated foil was dried at 85° C. and then cold pressed followed by edge cutting, sheet cutting, and slitting. The slit foil was dried for 4 hours in a vacuum condition at a temperature of 85° C. and a tab was welded to produce a positive-electrode plate of a lithium-ion battery.

Negative-electrode plate: The negative-electrode plate was prepared by a calendering method. In an environment with humidity ≤0.2% and temperature at 23° C., a 100 µm lithium belt was selected and attached to one side of a 6 µm copper collector, which was rolled at a roller temperature of 25° C. continuously to complete preparation of a single-sided negative-electrode plate. After the plate was wound and cooled down to 20° C., the same method was applied on the other side to complete preparation of a double-sided negative-electrode plate.

Preparation of Solid-State Lithium Metal Battery

The foregoing positive-electrode plate, solid-state electrolyte membrane and negative-electrode plate were center aligned, stacked in sequence, and cold pressed at room temperature and 250 MPa for 2 min to obtain a battery cell unit. A stack of 10 battery cell units were cold pressed and packaged in an outer package to obtain a solid-state lithium metal battery.

Comparative Examples 1 to 8

Preparation steps of Comparative Examples 1 to 8 are basically the same as those of Examples 1 to 25, with a difference in that supramolecular ionic liquids with different $R_1$ and $R_2$ were used to prepare solid-state electrolyte membranes in Comparative Examples 1 to 7, and a PEO/LiTFSI polymer solid-state electrolyte was used to prepare an electrolyte membrane in Comparative Example 8.

Specific parameters of the supramolecular ionic liquids and solid-state electrolyte membranes in Examples 1 to 25 are given in Table 1; specific parameters of the supramolecular ionic liquids and solid-state electrolyte membranes in Comparative Examples 1-8 are given in Table 2.

| | | Supramolecular ionic liquid | | | Solid-state electrolyte membrane | | | |
|---|---|---|---|---|---|---|---|---|
| | | R1 | R2 | Ionic conductivity at @25° C./ S*cm$^{-1}$ | Polymer matrix | Lithium salt | Membrane thickness | Ionic conductivity at @25° C./ S*cm$^{-1}$ |
| Example 1 | I-1 | *—O—CH$_2$—O—CH$_2$ | *—O—(CH$_2$)$_6$—* | 1.5*10$^{-3}$ | PEO/PVDF | LiTFSI | 25 μm | 0.3*10$^{-3}$ |
| Example 2 | I-2 | *—O—(OH$_2$)$_2$—O—CH$_2$—CH$_3$ | *—O—(CH$_2$)$_6$—* | 2.9*10$^{-3}$ | PEO/PVDF | LiTFSI | 25 μm | 0.8*10$^{-3}$ |
| Example 3 | I-3 | *—O—(OH$_2$)$_3$—O—CH$_2$—CH$_3$ | *—O—(CH$_2$)$_6$—* | 3.7*10$^{-3}$ | PEO/PVDF | LiTFSI | 25 μm | 1.0*10$^{-3}$ |
| Example 4 | I-4 | *—O—(OH$_2$)$_3$—O—CH$_2$—CH$_3$ | *—O—(CH$_2$)$_6$—* | 4.5*10$^{-3}$ | PEO/PVDF | LiTFSI | 25 μm | 1.8*10$^{-3}$ |
| Example 5 | I-5 | *—O—(OH$_2$)$_3$—O—CH$_2$—CH$_3$ | *—O—(CH$_2$)$_6$—* | 3.5*10$^{-3}$ | PEO/PVDF | LiTFSI | 25 μm | 1.2*10$^{-3}$ |
| Example 6 | I-6 | *—O—(OH$_2$)$_3$—O—(CH$_2$)$_2$—CH$_3$ | *—O—(CH$_2$)$_6$—* | 2.1*10$^{-3}$ | PEO/PVDF | LiTFSI | 25 μm | 0.7*10$^{-3}$ |
| Example 7 | I-7 | *—O—(CH$_2$)$_3$—OH | *—O—(CH$_2$)$_6$—* | 2.6*10$^{-3}$ | PEO/PVDF | LiTFSI | 25 μm | 0.9*10$^{-3}$ |
| Example 8 | I-8 | *—[O—(OH$_2$)$_3$]—O—CH$_2$—CH$_2$—* | *—O—(CH$_2$)$_6$—* | 4.4*10$^{-3}$ | PEO/PVDF | LiTFSI | 25 μm | 1.8*10$^{-3}$ |
| Example 9 | I-9 | *—O—(OH$_2$)$_3$—O—CH$_2$—CH$_2$—Cl | *—O—(CH$_2$)$_6$—* | 4.2*10$^{-3}$ | PEO/PVDF | LiTFSI | 25 μm | 1.7*10$^{-3}$ |
| Example 10 | I-10 | *—O—(OH$_2$)$_3$—O—CH$_2$—CH$_2$—Br | *—O—(CH$_2$)$_6$—* | 4.1*10$^{-3}$ | PEO/PVDF | LiTFSI | 25 μm | 1.5*10$^{-3}$ |
| Example 11 | I-11 | *—O—(OH$_2$)$_3$—O—CH$_2$—CH$_3$ | *—O—CH$_2$—* | 4.0*10$^{-3}$ | PEO/PVDF | LiTFSI | 25 μm | 1.5*10$^{-3}$ |
| Example 12 | I-12 | *—O—(OH$_2$)$_3$—O—CH$_2$—CH$_3$ | *—O—(CH$_2$)$_6$—* | 4.3*10$^{-3}$ | PEO/PVDF | LiTFSI | 25 μm | 1.6*10$^{-3}$ |
| Example 13 | I-13 | *—O—(OH$_2$)$_3$—O—CH$_2$—CH$_3$ | *—O—(CH$_2$)$_9$—* | 4.4*10$^{-3}$ | PEO/PVDF | LiTFSI | 25 μm | 1.8*10$^{-3}$ |
| Example 14 | I-14 | *—O—(OH$_2$)$_3$—O—CH$_2$—CH$_3$ | *—O—(CH$_2$)$_{12}$—* | 4.1*10$^{-3}$ | PEO/PVDF | LiTFSI | 25 μm | 1.4*10$^{-3}$ |
| Example 15 | I-15 | *—O—(OH$_2$)$_3$—O—CH$_2$—CH$_3$ | *—O—(CH$_2$)$_{18}$—* | 3.8*10$^{-3}$ | PEO/PVDF | LiTFSI | 25 μm | 1.1*10$^{-3}$ |

-continued

| | | Supramolecular ionic liquid | | | Solid-state electrolyte membrane | | | |
|---|---|---|---|---|---|---|---|---|
| | | R1 | R2 | Ionic conductivity at @25° C./ S*cm$^{-1}$ | Polymer matrix | Lithium salt | Membrane thickness | Ionic conductivity at @25° C./ S*cm$^{-1}$ |
| Example 16 | I-16 | *$\pm$O$\pm$(OH)$_2\pm_3$O—CH$_2$—CH$_3$ | *—O$\pm$CH$_2\pm_2$O$\pm$CH$_2\pm_2$* | 4.7*10$^{-3}$ | PEO/PVDF | LiTFSI | 25 μm | 1.9*10$^{-3}$ |
| Example 17 | I-17 | *$\pm$O$\pm$(OH)$_2\pm_3$O—CH$_2$—CH$_3$ | *—O$\pm$CH$_2\pm_2$O$\pm$CH$_2\pm_2$* | 5.0*10$^{-3}$ | PEO/PVDF | LiTFSI | 25 μm | 2.0*10$^{-3}$ |
| Example 18 | I-18 | *$\pm$O$\pm$(OH)$_2\pm_3$O—CH$_2$—CH$_3$ | *$\pm$O$\pm$CH$_2\pm_2\pm_3$O$\pm$CH$_2\pm_2$* | 5.5*10$^{-3}$ | PEO/PVDF | LiTFSI | 25 μm | 2.1*10$^{-3}$ |
| Example 19 | I-19 | *$\pm$O$\pm$(OH)$_2\pm_3$O—CH$_2$—CH$_3$ | *$\pm$O$\pm$CH$_2\pm_2\pm_3$O$\pm$CH$_2\pm_2$* | 5.3*10$^{-3}$ | PEO/PVDF | LiTFSI | 25 μm | 2.1*10$^{-3}$ |
| Example 20 | I-20 | *$\pm$O$\pm$(OH)$_2\pm_3$O—CH$_2$—CH$_3$ | *$\pm$O$\pm$CH$_2\pm_2\pm_3$O$\pm$CH$_2\pm_2$* | 4.8*10$^{-3}$ | PEO/PVDF | LiTFSI | 25 μm | 2.0*10$^{-3}$ |
| Example 21 | I-21 | *$\pm$O$\pm$(OH)$_2\pm_3$O—CH$_2$—CH$_3$ | *$\pm$O$\pm$CH$_2\pm_2\pm_3$O—CH$_2$—* | 5.5*10$^{-3}$ | PEO/PVDF | LiTFSI | 25 μm | 2.2*10$^{-3}$ |
| Example 22 | I-22 | *$\pm$O$\pm$(OH)$_2\pm_3$O—CH$_2$—CH$_3$ | *$\pm$O$\pm$CH$_2\pm_2\pm_3$O— | 6.5*10$^{-3}$ | PEO/PVDF | LiTFSI | 25 μm | 2.4*10$^{-3}$ |
| Example 23 | I-4 | *$\pm$O$\pm$(OH)$_2\pm_3$O—CH$_2$—CH$_3$ | *—O$\pm$CH$_2\pm_6$* | 4.5*10$^{-3}$ | PEO/PVDF | LiTFSI | 25 μm | 4.0*10$^{-4}$ |
| Example 24 | I-4 | *$\pm$O$\pm$(OH)$_2\pm_3$O—CH$_2$—CH$_3$ | *—O$\pm$CH$_2\pm_6$* | 4.5*10$^{-3}$ | PEO/PVDF | LiTFSI | 25 μm | 0.1*10$^{-3}$ |
| Example 25 | I-4 | *$\pm$O$\pm$(OH)$_2\pm_3$O—CH$_2$—CH$_3$ | *—O$\pm$CH$_2\pm_6$* | 4.5*10$^{-3}$ | PEO/PS | LiTFSI | 25 μm | 1.3*10$^{-3}$ |

TABLE 2

| | Supramolecular ionic liquid | | | Solid-state electrolyte membrane | | | |
|---|---|---|---|---|---|---|---|
| | R1 | R2 | Ionic conductivity at @25° C./ S*cm$^{-1}$ | Polymer matrix | Lithium salt | Membrane thickness | Ionic conductivity at @25° C./ S*cm$^{-1}$ |
| Comparative Example 1 | *$\dashv$O$\dashv$OH$\dashv_2\dashv_3$O-CH$_2$-CH$_3$ | *$\dashv$O$\dashv$OH$\dashv_2\dashv_7$O-CH$_2$-CH$_2$-* | 0.5*10$^{-3}$ | PVDF PEO/ | LiTFSI | 25 μm | 1.2*10$^{-5}$ |
| Comparative Example 2 | *$\dashv$O$\dashv$OH$\dashv_2\dashv_7$O-CH$_2$-CH$_3$ | *——O—(CH$_2$)$_{17}$—* | 0.7*10$^{-3}$ | PVDF PEO/ | LiTFSI | 25 μm | 1.4*10$^{-5}$ |
| Comparative Example 3 | *$\dashv$O$\dashv$OH$\dashv_2\dashv_7$O-CH$_2$-CH$_3$ | *——O—(CH$_2$)$_6$—* | 0.9*10$^{-3}$ | PVDF PEO/ | LiTFSI | 25 μm | 4.3*10$^{-5}$ |
| Comparative Example 4 | *$\dashv$O—(OH)$_2\dashv_3$-OH | *——O—(CH$_2$)$_{17}$—* | 0.4*10$^{-3}$ | PVDF PEO/ | LiTFSI | 25 μm | 1.1*10$^{-5}$ |
| Comparative Example 5 | H | N/A | 1.4*10$^{-10}$ | PVDF PEO/ | LiTFSI | 25 μm | 2.0*10$^{-6}$ |
| Comparative Example 6 | *$\dashv$S$\dashv$OH$\dashv_2\dashv_7$O-CH$_2$-CH$_3$ | *——S—(CH$_2$)$_6$—* | 3.3*10$^{-9}$ | PVDF PEO/ | LiTFSI | 25 μm | 2.4*10$^{-6}$ |
| Comparative Example 7 | *$\dashv$S$\dashv$OH$\dashv_2\dashv_7$O-CH$_2$-CH$_3$ | *——S—(CH$_2$)$_6$—* | 2.7*10$^{-10}$ | PVDF PEO/ | LiTFSI | 25 μm | 2.3*10$^{-6}$ |
| Comparative Example 8 | PEO/LiTFSI polymer solid-state electrolyte | | 8.7*10$^{-6}$ | PVDF PEO | LiTFSI | 25 μm | 8.7*10$^{-6}$ |

Cycling Performance Test

The specific test method was as follows: constant current charging and constant current discharging were performed at 25° C. with a charge/discharge voltage range of 2.8 V to 4.3 V and a charge/discharge rate of 0.5C. Initial capacity of the battery was recorded as $C_0$. A full charge and full discharge process completed by the battery was recorded as one cycle. The charge and discharge were performed according to the foregoing method, and capacity of the battery was tested after each cycle until the capacity of the battery was 80%*$C_0$. The number of cycles at that point was recorded.

Results of the cycling performance test of Examples 1 to 25 are given in Table 3; and results of the cycling performance test of Comparative Examples 1 to 8 are given in Table 4.

TABLE 3

| | Solid-state lithium metal battery | | | |
|---|---|---|---|---|
| | Design capacity (mAh) | Charge/ discharge rate | 1$^{st}$ cycle discharge capacity (mAh) | Cycles (capacity decayed to 80%) |
| Example 1 | 1-1 | 120 | 0.5 C/0.5 C | 98 | 404 |
| Example 2 | 1-2 | 120 | 0.5 C/0.5 C | 105 | 750 |
| Example 3 | 1-3 | 120 | 0.5 C/0.5 C | 109 | 804 |
| Example 4 | 1-4 | 120 | 0.5 C/0.5 C | 115 | 980 |
| Example 5 | 1-5 | 120 | 0.5 C/0.5 C | 110 | 905 |
| Example 6 | 1-6 | 120 | 0.5 C/0.5 C | 102 | 750 |
| Example 7 | 1-7 | 120 | 0.5 C/0.5 C | 104 | 205 |
| Example 8 | 1-8 | 120 | 0.5 C/0.5 C | 115 | 1002 |
| Example 9 | 1-9 | 120 | 0.5 C/0.5 C | 114 | 963 |
| Example 10 | 1-10 | 120 | 0.5 C/0.5 C | 112 | 907 |
| Example 11 | 1-11 | 120 | 0.5 C/0.5 C | 110 | 845 |
| Example 12 | 1-12 | 120 | 0.5 C/0.5 C | 112 | 874 |
| Example 13 | 1-13 | 120 | 0.5 C/0.5 C | 114 | 899 |
| Example 14 | 1-14 | 120 | 0.5 C/0.5 C | 110 | 829 |
| Example 15 | 1-15 | 120 | 0.5 C/0.5 C | 108 | 810 |
| Example 16 | 1-16 | 120 | 0.5 C/0.5 C | 115 | 893 |
| Example 17 | 1-17 | 120 | 0.5 C/0.5 C | 115 | 909 |
| Example 18 | 1-18 | 120 | 0.5 C/0.5 C | 115 | 619 |
| Example 19 | 1-19 | 120 | 0.5 C/0.5 C | 116 | 423 |

TABLE 3-continued

| | Solid-state lithium metal battery | | | |
|---|---|---|---|---|
| | Design capacity (mAh) | Charge/ discharge rate | 1$^{st}$ cycle discharge capacity (mAh) | Cycles (capacity decayed to 80%) |
| Example 20 | 1-20 | 120 | 0.5 C/0.5 C | 116 | 371 |
| Example 21 | 1-21 | 120 | 0.5 C/0.5 C | 118 | 376 |
| Example 22 | 1-22 | 120 | 0.5 C/0.5 C | 119 | 409 |
| Example 23 | 1-4 | 120 | 0.5 C/0.5 C | 90 | / |
| Example 24 | 1-4 | 120 | 0.5 C/0.5 C | 31 | / |
| Example 25 | 1-4 | 120 | 0.5 C/0.5 C | 106 | 698 |

TABLE 4

| | Solid-state lithium metal battery | | | |
|---|---|---|---|---|
| | Design capacity (mAh) | Charge/ discharge rate | 1$^{st}$ cycle discharge capacity (mAh) | Cycles (capacity decayed to 80%) |
| Comparative Example 1 | 120 | 0.5 C/0.5 C | 65 | / |
| Comparative Example 2 | 120 | 0.5 C/0.5 C | 44 | / |
| Comparative Example 3 | 120 | 0.5 C/0.5 C | 50 | / |
| Comparative example 4 | 120 | 0.5 C/0.5 C | 35 | / |
| Comparative Example 5 | 120 | 0.5 C/0.5 C | 2.5 | / |
| Comparative Example 6 | 120 | 0.5 C/0.5 C | 2.6 | / |
| Comparative Example 7 | 120 | 0.5 C/0.5 C | 2.5 | / |
| Comparative Example 8 | 120 | 0.5 C/0.5 C | 2.1 | / |

Test Result Analysis

Examples 1 to 25 and Comparative Examples 1 to 8

Using a conventional PEO/LiTFSI polymer solid-state electrolyte, Comparative Example 8 has an ionic conductivity of only $8.7*10^{-6}$ S/cm at 25° C. In comparison, ionic conductivity of the supramolecular ionic liquids in Examples 1 to 25 is as high as $10^{-3}$ S/cm at 25° C., and the ionic conductivity of a solid-state electrolyte membrane made therefrom is also as high as $10^{-3}$ S/cm at room temperature, which is close to performance of a liquid electrolyte, indicating that the supramolecular ionic liquid and the solid-state electrolyte membrane of this disclosure can be an effective solution to the problem of low ionic conductivity, which is common in existing solid-state electrolytes.

Several supramolecular ionic liquids and solid-state electrolyte membranes with similar structures are given in Comparative Examples 5 to 7. It can be seen that ionic conductivity of these supramolecular ionic liquids is still low at 25° C., indicating that a side chain structure of the supramolecular ionic liquid of this disclosure is closely related to its ionic conductivity.

Comparative Examples 1 to 4 have similar parent nucleus structures in the supramolecular ionic liquid as Examples 1 to 25, but in Examples 1 to 25, quantities of carbon atoms in $R_1$ and $R_2$ are fewer than 16; whereas in Comparative Examples 1 to 4, the quantities of carbon atoms in $R_1$ and $R_2$ are more than 16. In this case, the ionic conductivity of the supramolecular ionic liquids and the solid-state electrolyte membranes in Examples 1 to 25 at 25° C. is significantly superior to that of Comparative Examples 1 to 4. When the quantities of carbon atoms in $R_1$ and $R_2$ are above 16, chains of $R_1$ and $R_2$ are overlong, affecting orderliness of a π-π stacking structure in the supramolecular ionic liquid, which has adverse effect on construction of an ion migration channel. As a result, the supramolecular ionic liquid and the solid-state electrolyte membranes have poor ionic conductivity at 25° C.

Examples 1 to 7

Examples 1 to 7 show how an increased quantity of carbon atoms in $R_1$ influences the ionic conductivity of supramolecular ionic liquids and solid-state electrolyte membranes, when $R_2$ remains unchanged. As can be seen from the data in Table 1 and Table 2, while $R_2$ remains unchanged, as the quantity of carbon atoms increases, the ionic conductivity of supramolecular ionic liquids and solid-state electrolyte membranes first increases and then decreases. When m1 is selected from 1-6 or 2-3, n1 is selected from 1-5 or 2-3, and p1 is selected from 0-4 or 1-2, a chain length of $R_1$ is in an appropriate range, the orderliness of a π-π stacking structure in the supramolecular ionic liquid is desirable, and a volume of free radicals is appropriate, which helps the construction of the ion migration channel and increases lithium ion migration capacity, and the ionic conductivity of supramolecular ionic liquids and solid-state electrolyte membranes is increased.

It is worth adding that in Example 7 where the structure of $R_1$ contains a terminal hydroxyl group, the ionic conductivity of the supramolecular electrolyte is still low. Because of the terminal hydroxyl group, the electrolyte has a side reaction with lithium metal, producing lithium oxide that has low ionic conductivity, which increases interfacial polarization. Therefore, the ionic conductivity of a solid-state electrolyte membrane made from the supramolecular ionic liquid in Example 7 has poor ionic conductivity.

Example 4 and Examples 8 to 10

Example 4 and Examples 8 to 10 show how halogen substitution at the end of $R_1$ influences technical effects of this disclosure. As can be seen from the data in Table 1 and Table 2, halogen substitution at the end of $R_1$ has little effect on the ionic conductivity of supramolecular ionic liquids and solid-state electrolyte membranes, and supramolecular ionic liquids have good ionic conductivity. When the end of $R_1$ is substituted by halogen, LiF produced during cell cycling is helpful to form a stable interface, and thus cycling performance of the battery is also further enhanced.

Example 4 and Examples 11 to 15

Example 4 and Examples 11 to 15 show how an increased quantity of carbon atoms in $R_2$ influences the ionic conductivity of supramolecular ionic liquids and solid-state electrolyte membranes, when $R_1$ remains unchanged and n2 in $R_2$ is 0. When p2 is selected from 1-16 or 4-10, $R_2$ has an appropriate chain length, which helps formation of a stable cylindrical structure by self assembly of benzophenanthrene structures through π-π stacking, improving the ionic conductivity of the supramolecular ionic liquids and the solid-state electrolyte membranes.

In addition, when quantities of carbon atoms in $R_2$ and $R_1$ are close or equal, a cylindrical structure formed by self assembly of benzophenanthrene structures through π-π stacking is most stable which in conducive to formation of the ion migration channel. Therefore, the supramolecular ionic liquids and the solid-state electrolyte membranes have good ionic conductivity.

Example 4 and Examples 16 to 22

Example 4 and Examples 16 to 22 show influence of an increase quantity of carbon atoms in $R_2$, when $R_1$ remains unchanged and n2 in $R_2$ is not 0. When n2 in $R_2$ is not 0, the supramolecular ionic liquid is a structure with ether chains fully substituted, and the supramolecular ionic liquid has desirable ionic conductivity. However, fluidity of the supramolecular ionic liquid with ether chains fully substituted is also strong. When a polymer matrix is introduced to further prepare the solid-state electrolyte membrane, interaction between the supramolecular ionic liquid and the polymer matrix is relatively strong, and mechanical strength of the solid-state electrolyte membrane is not high, leading to less ability to inhibit growth of lithium dendrites and putting the battery at risk of short circuit. Therefore, there should not be too many ether-oxygen repeating units in $R_2$.

Example 4 and Examples 23 to 25

Example 4 and Examples 23 to 25 show technical effects of preparing solid-state electrolyte membranes using a same supramolecular ionic liquid and different lithium salts. Because the polymer matrix has different dissociation capacities for different lithium salts, when lithium salt LiTFSI is used, the ionic conductivity of the solid-state electrolyte membrane and capacity development and cycling performance of the solid-state lithium metal battery are desirable.

Based on the disclosure and teaching of this specification, a person skilled in the art may make changes or modifica-

The invention claimed is:

1. A solid-state electrolyte membrane comprising a supramolecular ionic liquid, wherein the supramolecular ionic liquid comprises a benzophenanthrene structure represented by formula (I):

(I)

[Chemical structure of benzophenanthrene with R₁ substituents at multiple positions and R₂—S(=O)₂—OLi group]

wherein
$R_1$ is selected from ether groups, polyether groups, halogenated ether groups, or halogenated polyether groups having 1 to 16 carbon atoms; and
$R_2$ is selected from ether groups or polyether groups having 1 to 16 carbon atoms.

2. The solid-state electrolyte membrane according to claim 1, wherein $R_1$ is selected from structures represented by formula (II):

$$*\!-\!\!\left[O\!-\!\left(CH_2\right)_{m1}\right]_{n1}\!\!-\!O\!-\!\left(CH_2\right)_{p1}\!-\!Y \quad (II)$$

wherein
m1 is selected from 1-6,
n1 is selected from 1-5,
p1 is selected from 0-4, and
Y is selected from H, F, Cl, or Br.

3. The solid-state electrolyte membrane according to claim 2, wherein the formula (II) meets at least one of the following conditions:
(1) m1 is selected from 2-3;
(2) n1 is selected from 2-3;
(3) p1 is selected from 1-2; and
(4) Y is selected from H or F.

4. The solid-state electrolyte membrane according to claim 1, wherein $R_2$ is selected from structures represented by formula (III):

$$*\!-\!\!\left[O\!-\!\left(CH_2\right)_{m2}\right]_{n2}\!\!-\!O\!-\!\left(CH_2\right)_{p2}\!-\!* \quad (III)$$

wherein
when n2 is not 0, m2 is selected from 1-6, n2 is selected from 1-5, and p2 is selected from 0-4; and
when n2 is 0, p2 is selected from 1-16, and optionally, p2 is selected from 4-10.

5. The solid-state electrolyte membrane according to claim 4, wherein
when n2 is not 0, the formula (III) meets at least one of the following conditions:
(1) m2 is selected from 2-3;
(2) n2 is selected from 2-3; and
(3) p2 is selected from 1-2.

6. The solid-state electrolyte membrane according to claim 1, wherein $R_1$ and $R_2$ in the formula (I) are selected from one of I-1 to I-22:

I-1
$R_1 = *\!-\!O\!-\!CH_2\!-\!O\!-\!CH_3, \quad R_2 = *\!-\!O\!-\!(CH_2)_{6}\!-\!*$ I-2
$R_1 = *\!-\!O\!-\!(CH_2)_{2}\!-\!O\!-\!CH_2\!-\!CH_3, \quad R_2 = *\!-\!O\!-\!(CH_2)_{6}\!-\!*$ I-3
$R_1 = *\!-\!\left[O\!-\!(CH_2)_2\right]_2\!\!-\!O\!-\!CH_2\!-\!CH_3, \quad R_2 = *\!-\!O\!-\!(CH_2)_{6}\!-\!*$ I-4
$R_1 = *\!-\!\left[O\!-\!(CH_2)_2\right]_3\!\!-\!O\!-\!CH_2\!-\!CH_3, \quad R_2 = *\!-\!O\!-\!(CH_2)_{6}\!-\!*$ I-5
$R_1 = *\!-\!\left[O\!-\!(CH_2)_3\right]_4\!\!-\!O\!-\!CH_2\!-\!CH_3, \quad R_2 = *\!-\!O\!-\!(CH_2)_{6}\!-\!*$ I-6
$R_1 = *\!-\!\left[O\!-\!(CH_2)_4\right]_3\!\!-\!O\!-\!(CH_2)_2\!-\!CH_3, \quad R_2 = *\!-\!O\!-\!(CH_2)_{6}\!-\!*$ I-7
$R_1 = *\!-\!\left[O\!-\!(CH_2)_4\right]_4\!\!-\!OH, \quad R_2 = *\!-\!O\!-\!(CH_2)_{6}\!-\!*$ I-8
$R_1 = *\!-\!\left[O\!-\!(CH_2)_2\right]_3\!\!-\!O\!-\!CH_2\!-\!CH_2\!-\!F, \quad R_2 = *\!-\!O\!-\!(CH_2)_{6}\!-\!*$ I-9
$R_1 = *\!-\!\left[O\!-\!(CH_2)_2\right]_3\!\!-\!O\!-\!CH_2\!-\!CH_2\!-\!Cl, \quad R_2 = *\!-\!O\!-\!(CH_2)_{6}\!-\!*$ I-10
$R_1 = *\!-\!\left[O\!-\!(CH_2)_2\right]_3\!\!-\!O\!-\!CH_2\!-\!CH_2\!-\!Br, \quad R_2 = *\!-\!O\!-\!(CH_2)_{6}\!-\!*$ I-11
$R_1 = *\!-\!\left[O\!-\!(CH_2)_2\right]_3\!\!-\!O\!-\!CH_2\!-\!CH_3, \quad R_2 = *\!-\!O\!-\!CH_2\!-\!*$ I-12
$R_1 = *\!-\!\left[O\!-\!(CH_2)_2\right]_3\!\!-\!O\!-\!CH_2\!-\!CH_3, \quad R_2 = *\!-\!O\!-\!(CH_2)_{3}\!-\!*$ I-13
$R_1 = *\!-\!\left[O\!-\!(CH_2)_2\right]_3\!\!-\!O\!-\!CH_2\!-\!CH_3, \quad R_2 = *\!-\!O\!-\!(CH_2)_{9}\!-\!*$ I-14
$R_1 = *\!-\!\left[O\!-\!(CH_2)_2\right]_3\!\!-\!O\!-\!CH_2\!-\!CH_3, \quad R_2 = *\!-\!O\!-\!(CH_2)_{12}\!-\!*$ I-15
$R_1 = *\!-\!\left[O\!-\!(CH_2)_2\right]_3\!\!-\!O\!-\!CH_2\!-\!CH_3, \quad R_2 = *\!-\!O\!-\!(CH_2)_{16}\!-\!*$ I-16
$R_1 = *\!-\!\left[O\!-\!(CH_2)_2\right]_3\!\!-\!O\!-\!CH_2\!-\!CH_3,$
$R_2 = *\!-\!O\!-\!(CH_2)_3\!-\!O\!-\!(CH_2)_2\!-\!*$ I-17
$R_1 = *\!-\!\left[O\!-\!(CH_2)_2\right]_3\!\!-\!O\!-\!CH_2\!-\!CH_3,$
$R_2 = *\!-\!O\!-\!(CH_2)_6\!-\!O\!-\!(CH_2)_2\!-\!*$ -continued

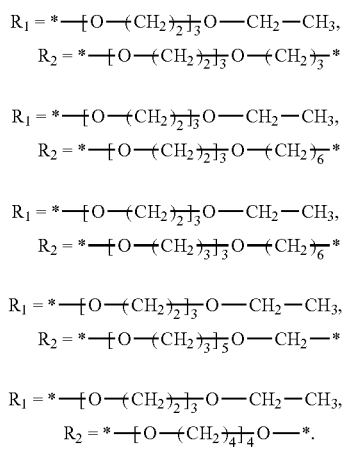

7. The solid-state electrolyte membrane according to claim 1, wherein the supramolecular ionic liquid is a cylindrical structure formed by a number of the benzophenanthrene structures through π-π stacking and self assembly.

8. The solid-state electrolyte membrane according to claim 1, wherein a q value of small-angle X-ray scattering peak of the supramolecular ionic liquid is 15.5 nm$^{-1}$ to 18.8 nm$^{-1}$; optionally, the q value is 16.0 nm$^{-1}$ to 18.5 nm$^{-1}$, and further optionally, the q value is 16.3 nm$^{-1}$ to 18.2 nm$^{-1}$.

9. The solid-state electrolyte membrane according to claim 1, wherein ionic conductivity of the supramolecular ionic liquid at 25° C. is 2*10$^{-5}$ S/cm to 7*10$^{-3}$ S/cm; optionally, the ionic conductivity is 1.5*10$^{-3}$ S/cm to 6.5*10$^{-3}$ S/cm.

10. The solid-state electrolyte membrane according to claim 1, wherein the solid-state electrolyte membrane further comprises a polymer matrix, and the polymer matrix meets at least one of the following conditions:
  (1) the polymer matrix comprises a viscoelastic polymer, and a relative molecular mass of the polymer matrix is 1,000-2,000,000;
  (2) crystallinity of the polymer matrix is 1%-40%, optionally, 5%-25%;
  (3) the polymer matrix comprises a first polymer and a second polymer, wherein a relative molecular mass of the first polymer is 400,000-800,000, and a relative molecular mass of the second polymer is 1,000-10,000, optionally, a mass ratio of the first polymer and the second polymer is 10:1-5:1; and
  (4) the polymer matrix is selected from one or more of polyethylene oxide, polyethylene terephthalate, polyimide, polyvinylidene fluoride, polymethyl methacrylate, polyacrylonitrile, polypropylene carbonate, polyvinyl chloride, or polyvinylidene fluoride-(2-acrylamido-2-methylpropane sulfonic acid)-trimethylolpropane triacrylate-hyperbranched polyacrylate-methyl methacrylate-copolymer, and optionally, the polymer matrix is selected from one or more of polyethylene oxide, polyvinylidene fluoride, or polymethyl methacrylate.

11. The solid-state electrolyte membrane according to claim 1, wherein the solid-state electrolyte membrane further comprises a lithium salt, and the lithium salt is selected from one or more of LiPF$_6$, LiBF$_4$, LiClO$_4$, LiAsF$_6$, LiCF$_3$SO$_3$, LiFSI, or LiTFSI; and optionally, the lithium salt is LiTFSI.

12. A solid-state lithium metal battery, comprising the solid-state electrolyte membrane according to claim 1.

13. An apparatus, comprising the solid-state lithium metal battery according to claim 12, wherein the solid-state lithium metal battery is capable of serving as a power source of the apparatus or as an energy storage unit of the apparatus.

14. A method for preparing a solid-state electrolyte membrane, the method comprising:
  providing a polymer matrix, a lithium salt, and a supramolecular ionic liquid; and
  mixing, hot pressing, and vacuum annealing the polymer matrix, the lithium salt, and the supramolecular ionic liquid to obtain the solid-state electrolyte membrane,
  wherein the supramolecular ionic liquid comprises a benzophenanthrene structure represented by formula (I):

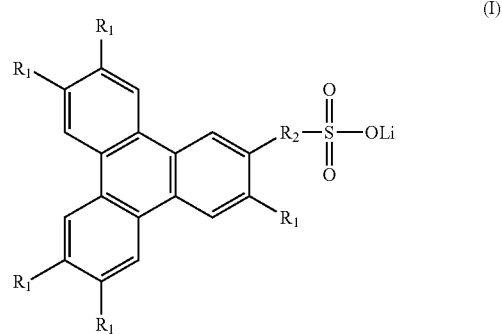

wherein
R$_1$ is selected from ether groups, polyether groups, halogenated ether groups, or halogenated polyether groups having 1 to 16 carbon atoms; and
R$_2$ is selected from ether groups or polyether groups having 1 to 16 carbon atoms.

15. The method according to claim 14, wherein a mass ratio of the polymer matrix, the lithium salt, and the supramolecular ionic liquid is 100:(5-40):(10-80).

* * * * *